UNITED STATES PATENT OFFICE.

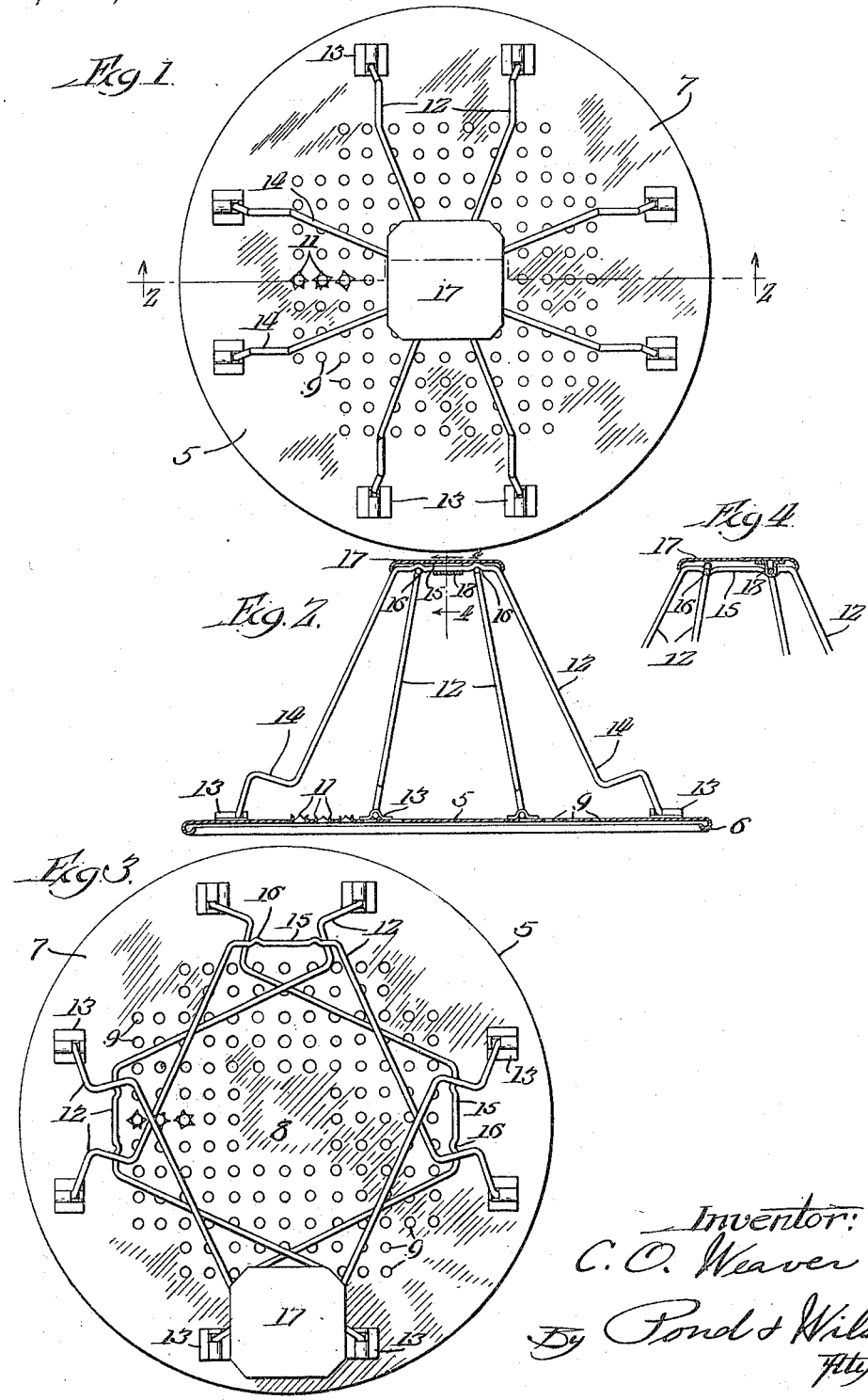

CYRENIUS O. WEAVER, OF ROCKFORD, ILLINOIS.

TOASTER.

1,216,525.  Specification of Letters Patent.  Patented Feb. 20, 1917.

Application filed July 28, 1915. Serial No. 42,411.

*To all whom it may concern:*

Be it known that I, CYRENIUS O. WEAVER, a citizen of the United States, residing at Rockford, in the county of Winnebago and State of Illinois, have invented certain new and useful Improvements in Toasters, of which the following is a specification.

This invention relates to bread toasters particularly adapted to be positioned over gas burners to effect toasting of bread.

The primary object of my invention is to provide a toaster simple and improved in construction, by means of which bread may be toasted quickly, evenly and economically, and which may be manufactured at a low cost.

Another object of my invention is to provide a collapsible toaster of few parts, which may be folded into a compact, substantially flat form so as to occupy but little space, and thus be convenient and inexpensive to ship.

With these ends in view my invention, generally stated, consists in providing a substantially flat base imperforate at its center and marginal portions and provided intermediate these portions with a plurality of closely arranged apertures, supports pivotally mounted on the marginal portion of the base and constructed to support slices of bread in an inclined position above the said apertures and to be folded adjacent to the base, when desired, and a deflector plate sustained by said supporting means above the center of the base so as to deflect rising heated air outwardly to bread positioned on said supports and being movable with the supports to collapsed position.

The mode and principle of operation of my invention will become better understood by reference to the following description when considered in connection with the accompanying drawing, wherein—

Figure 1 is a plan view of my improved bread toaster;

Fig. 2 is a sectional view of the toaster taken on the line 2—2 of Fig. 1;

Fig. 3 is a plan view of the toaster collapsed; and

Fig. 4 is a detail view taken on the line 4—4 of Fig. 2 showing the attachment of the deflector to one of the bread supports.

Referring to the drawing, reference character 5 designates in general the base of the toaster, formed preferably of a flat circular piece of sheet metal having its rim turned downwardly and inwardly forming a bead 6, imperforate at its marginal and center portions 7 and 8 respectively, and perforated intermediate these portions, preferably by a plurality of closely associated apertures 9 arranged as shown. When the base is positioned over a gas burner as on an ordinary gas stove, the bead 6 serves as a means for preventing escape of heated air laterally from the base and the apertures permit the heated air to pass upwardly through the base and serve also to distribute this air evenly over the area directly above the perforate portion of the base. Although the majority of these apertures are indicated as being clean-cut at their edges, I have found that when the apertures are formed by punching a tool upwardly through the base so as to give the apertures a ragged edge, as indicated at 11, better distribution of heat is obtained for the purpose of toasting bread.

Supports for so holding slices of bread above the perforated portion of the base as to lie in the path of heated air rising therefrom, are pivotally mounted on the marginal portion of the base so as to be movable, when desired, from bread supporting to collapsed position in close proximity to the base. These supports, designated in general by reference character 12, are formed of wire lengths or members constructed and arranged so that a pair of these members together form the means for supporting two slices of bread on opposite sides of the center of the base. Two pairs of supporting members are employed, being crossed at right angles at the center of the base so as to support four slices of bread in rectangular arrangement above the perforate portion of the base. Each wire length, pivoted at its ends in brackets 13 welded or otherwise secured to the base and shaped as shown, to hold said ends of the wire lengths against axial displacement, is arched at its center portion and shaped to form oppositely disposed rests 14 for receiving and holding slices of bread at opposite sides of the center of the base and inclined to the vertical so that the faces of the bread will lie in the path of heated air rising from the apertures. Each member 12 is shaped at its top to form a horizontal portion 15 which is formed with offsets 16 at the intersection of the members, whereby the members may be detachably interlocked at their intersections and held in upright bread supporting position and whereby the members 12 may be sprung slightly and released from their interlocking positions so as to be folded down against the base in the manner shown in Fig. 3. From the foregoing, it will be apparent that two pairs of arched wire members pivoted at their ends to the marginal portion of the base and crossed at their center portions, are adapted to support slices of bread above the apertured portion of the base and to be moved, after their interlocking portions have been disengaged, to lowered position in close proximity to the base. It will also be apparent that the members 12 are permanently secured to the base so as not to become detached therefrom either accidentally or by contraction of the members due to exposure to the heated air whereby their pivoted ends might be drawn axially from their supports.

An imperforate deflector plate or cap 17, shaped to cover the space bounded by the upper ends of the bread rests 14, is pivotally mounted on one of the overlying or uppermost cross portions 15 of a member 12 through the intermediary of a bracket 18 secured to the underside of the deflector. This deflector, while serving as a cap to cover the intersection of the supports 12 and lending a finished appearance to the toaster, is designed, primarily, to deflect outwardly against the slices of bread rising heated air that might otherwise escape through the open top of the toaster.

In moving the bread supports to lowered position the outer end of the cap 17 is swung upwardly which will withdraw the cross portion upon which it is mounted out of the depressions of the engaged cross portions, thus permitting the cross portion parallel thereto to be disengaged, allowing the bread supports to be swung to lowered position.

Thus, it will be noted that the toaster is constructed so that with but a small number of parts, and these exceedingly simple in construction, heated air is so controlled and directed to bread positioned on the supports as to effectively and efficiently toast the bread. Attention is directed to the peculiar arrangement of the apertures and the relation of the bread supports thereto whereby the heated air is distributed evenly to only those areas occupied by the bread and to the fact that by arranging four slices of bread separately on the several rests, the bread forms, in conjunction with the deflector 17, substantially the sole means for retaining the heated air within its desired limits for toasting purposes.

To collapse the toaster, the outer end of the deflector is first raised sufficiently to permit the supporting member 12 adjacent to said end to be swung outwardly, whereupon the member carrying the deflector may be swung outwardly, thus permitting the members 12 to be moved respectively to lowered position shown in Fig. 3. The deflector 17 by reason of its pivotal mounting may be positioned, when the parts are collapsed, closely associated with the base and thus the complete article in this compact arrangement in which all of the movable parts are contained within the perimeter of the base, will occupy but little space so that it may be conveniently packed and shipped.

It is believed that from the foregoing, a clear understanding of my invention may be had, and while I have illustrated but one practical embodiment of the invention, it should be understood that various changes in details of construction might be resorted to without departing from the spirit and scope of the invention as set forth in the appended claims.

I claim:

1. A toaster comprising a base, pairs of wire members pivotally mounted at their ends on marginal portions of the base and spaced apart quarteringly thereon, so that the pairs cross above the center portion of the base, each pair of members being arched at their center portion forming a support for holding slices of bread, and being shaped at their intersecting arched portions so as to detachably engage one with the other and sustain the members in bread supporting position and permitting the members to be disengaged and folded adjacent to the base.

2. A toaster comprising a base, toast supports constructed of wire sections crossed at the center of the base and pivotally mounted at their ends thereon, the wire sections being shaped to form oppositely disposed rests adapted to receive slices of bread inclined upwardly and inwardly, the base being constructed to permit heated air to pass upwardly therethrough to toast the bread positioned on said supports, and means for detachably retaining the crossed center portions of the wire sections in fixed relation and permitting the sections to be folded into close proximity to the base.

3. In a toaster, the combination of a base, toast supports comprising arched metallic strips arranged in upright position to cross at their arched portions and pivoted at their ends to the base so as to be foldable into close proximity thereto, said supports being shaped to carry slices of bread in upright position on opposite sides of their crossed portions inclined toward the same and being yieldably engageable at their said crossed portions whereby the supports are sustained in upright bread-supporting position and may be detached and moved to said lowered position.

4. In a toaster, the combination of a base, a plurality of pairs of toast supports, each pair consisting of arched members parallelly arranged and pivotally mounted at their ends on the base and constructed to carry a slice of bread on opposite sides of and inclined toward the center of the supports, the said pairs of supports being arranged to cross substantially at right angles and to engage one with the other when in upright position so as to be held in such position.

5. A toaster comprising a base, toast supports in the form of wire sections pivoted at their ends to the base and shaped to provide upwardly converging toast supports and a comparatively flat top portion joining the toast-supporting portions, said supports being arranged so that their top portions cross and are engageable one with another to hold the supports in upright position, and a cap or deflector plate pivotally mounted on one of the supports and adapted when the supports are folded into lowered position to lie in close proximity to the base.

CYRENIUS O. WEAVER.

Copies of this patent may be obtained for five cents each, by addressing the "Commissioner of Patents, Washington, D. C."